(12) United States Patent
Nykänen et al.

(10) Patent No.: US 6,534,122 B1
(45) Date of Patent: Mar. 18, 2003

(54) METHOD AND ARRANGEMENT IN CONNECTION WITH OPTICAL FIBER COATING

(75) Inventors: Jari Nykänen, Vantaa (FI); Mika Aunola, Imatra (FI); Jukka Olkkonen, Klaukkala (FI)

(73) Assignee: Nextrom Holding S.A., Ecublens (SE)

( * ) Notice: Subject to any disclaimer, the term of this patent is extended or adjusted under 35 U.S.C. 154(b) by 0 days.

(21) Appl. No.: 09/701,179

(22) PCT Filed: Jun. 17, 1999

(86) PCT No.: PCT/FI99/00531

§ 371 (c)(1),
(2), (4) Date: Dec. 27, 2000

(87) PCT Pub. No.: WO99/65836

PCT Pub. Date: Dec. 23, 1999

(30) Foreign Application Priority Data

Jun. 18, 1998 (FI) .................................................. 981425

(51) Int. Cl.[7] .............................. B05D 5/06; G02B 6/44; B05C 13/02
(52) U.S. Cl. .................... 427/163.2; 427/172; 118/672; 118/675; 118/500; 118/503
(58) Field of Search .......................... 427/163.1, 163.2, 427/172, 444; 118/668, 672, 673, 675, 676, 71, 500, 123, 125, 126, 503; 269/37; 414/222.01

(56) References Cited

U.S. PATENT DOCUMENTS 5,505,398 A   4/1996   Emmerich
5,881,189 A * 3/1999   Carberry et al. .............. 385/39

FOREIGN PATENT DOCUMENTS

JP   06-160663 A  *  6/1994
SE   441 068        9/1985

* cited by examiner

Primary Examiner—Shrive P. Beck
Assistant Examiner—Wesley D. Markham
(74) Attorney, Agent, or Firm—Oliff & Berridge, PLC

(57) ABSTRACT

The invention relates to a method and an arrangement in connection with coating of an optical fibre, in which a first fibre (3a) is directed from a fibre pay-off forward in the process via a press head (2a) forming the coating, and when the first fibre (3a) ends, a new fibre (3b) is directed to the press head (2a) in advance, and when the first fibre (3a) ends, a roll device (7) grips both the first fibre and the new fibre so that both fibres (3a, 3b) are caught between freely rotating rolls (7a, 7b) of the roll device (7), whereupon the tail of the first fibre (3a) makes the rolls (7a, 7b) of the roll device rotate, and the rotational movement of the rolls pushes the new fibre (3b) to the press head (2a) at a speed equal to that of the line.

10 Claims, 2 Drawing Sheets

METHOD AND ARRANGEMENT IN CONNECTION WITH OPTICAL FIBER COATING

BACKGROUND OF THE INVENTION

1. Field of the Invention

The invention relates to a method in connection with coating of an optical fibre or the like, wherein a first fibre or the like is directed from a fibre pay-off forward in the process via a press head forming the coating, and when the first fibre or the like ends, a new fibre or the like is guided to the press head and through it. The invention also relates to an arrangement in connection with an optical fibre or the like.

2. Description of Related Art

When a fibre ends in an optical fibre coating process, such as a tight buffer process, also the buffer supplied from the press head breaks in prior art solutions. In such a situation, the line operator has been forced to manually thread the buffer again through the line, in other words to restart the process. In such a restart the amount of wasted fibre rapidly increases to several dozens of meters, which also raises the costs due to the loss of material. Another problem has been that manual threading is laborious and slow, which further increases the costs and reduces the degree of use of the line. Further, manual threading is also an obvious security risk.

SUMMARY OF THE INVENTION

The purpose of the invention is to provide a method and an arrangement which eliminate the prior art drawbacks. This is achieved with the method and arrangement according to the invention. The method according to the invention is characterized in that the new fibre or the like is directed to the vicinity of the press head in advance, so that when the first fibre or the like ends, a roll device grips both the first fibre and the new fibre or the like so that both fibres or the like are caught between freely rotating rolls of the roll device, whereupon the tail of the first fibre or the like makes the rolls of the roll device rotate, whereafter the rotational movement of the rolls pushes the new fibre or the like to the press head at a speed equal to that of the line. The arrangement according to the invention is, in turn, characterized in that the arrangement comprises a holder and a roll device comprising two freely rotating rolls, which have two positions: a first position where the rolls are spaced apart and a second position where the rolls are pressed together, the rolls being arranged before the press head at opposite sides of the fibre line passing through the press head, and the holder being arranged to keep the end of the new fibre or the like near the press head such that the end of the new fibre or the like is positioned between the rolls placed in the first position of the roll device as the first fibre or the like travels from between the rolls of the roll device to the press head, and that when the first fibre or the like ends, the rolls of the roll device are arranged to move into the second position so that both the first fibre and the new fibre or the like remain between the rolls and the tail of the first fibre or the like makes the rolls rotate, and the holder is arranged to open, whereupon the rotational movement of the rolls pushes the new fibre or the like to the press head at a speed equal to that of the line.

A primary advantage of the invention is that it avoids the time-consuming and laborious manual restart, wherefore the amount of wasted fibre remains as small a possible. The invention thus provides economic advantages due to lower fibre costs and an improved degree of use of the line. Further, the structure of the arrangement according to the invention is simple and reliable. The invention also improves the operational safety of the line since the operator does not have to thread a fibre manually through the entire line or to feed a new fibre into the process during the operation of the line.

BRIEF DESCRIPTION OF THE DRAWINGS

In the following, the invention will be described in greater detail by means of a preferred embodiment shown in the accompanying drawing, in which.

DETAILED DESCRIPTION OF THE PREFERRED EMBODIMENTS

Figure 1:
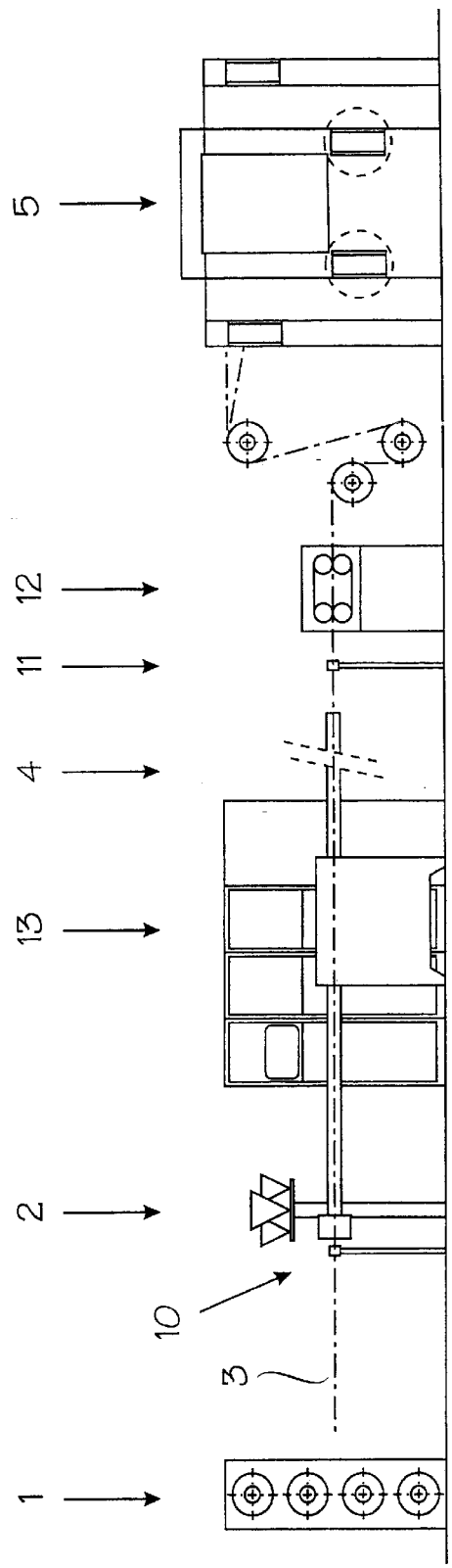
FIG. 1 is a general view of a fibre coating line.

FIG. 1 shows generally a line used for coating an optical fibre. In FIG. 1, reference numeral 1 generally denotes fibre pay-offs and reference numeral 2 denotes a press apparatus comprising an actual press head and other means which are used to provide the surface of an optical fibre with a coating. The optical fibre is denoted in FIG. 1 by reference numeral 3. Reference numeral 4 denotes generally means used for cooling the coated fibre, and reference numeral 5 correspondingly denotes means for winding the coated fibre onto a reel. Reference numeral 10 denotes an arrangement according to the invention, reference numeral 11 denotes a diameter measuring device, and reference numeral 12 denotes a pulling device for an optical fibre cable. Reference numeral 13 denotes a line control unit.

The aforementioned matters constitute fully conventional technology to those skilled in the art, wherefore they will not be described in greater detail herein.

When a fibre is coated on a line shown in FIG. 1, in prior art solutions the coating process has been interrupted after the fibre supplied from the fibre pay-off 1 has ended, whereafter the operator has been forced to manually thread a new fibre from the fibre pay-off through the entire line. However, this kind of procedure causes problems, as described above.

The invention relates to a method and an arrangement which enable continuous fibre coating. Therefore the line operator is able to prepare a new fibre during the process to be ready when the old fibre runs out. When this happens, the arrangement according to the invention begins to operate and feeds a new fibre to the press head without the process being interrupted. The fibre joint can be marked and removed in subsequent process steps.

Figure 2:
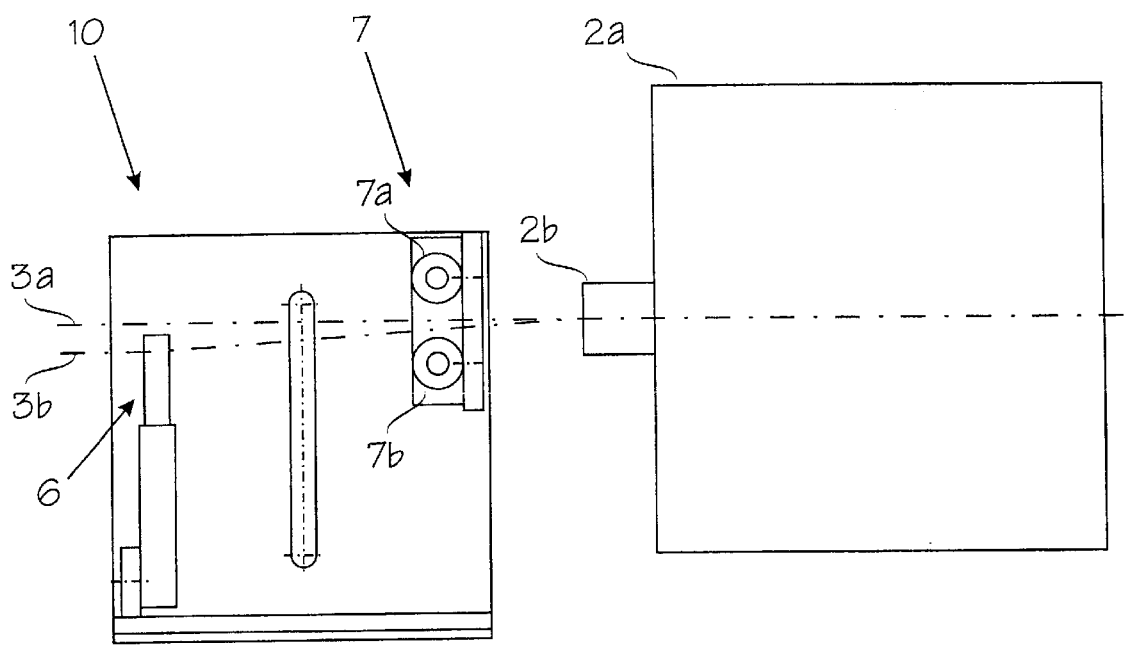
FIG. 2 is a side view of an arrangement according to the invention.
Figure 3:
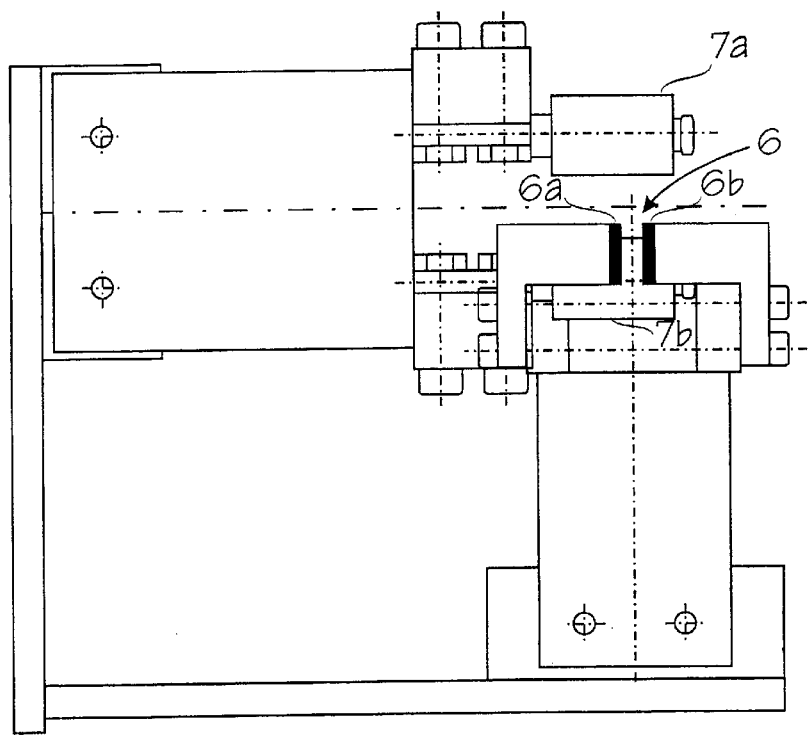
FIG. 3 shows the arrangement of FIG. 2 viewed from the direction of travel of the fibre.

The arrangement according to the invention is described in FIGS. 2 and 3. The arrangement shown in FIGS. 2 and 3 is placed on the coating line at a point immediately preceding the press head. The arrangement comprises a holder 6 and a roll device 7, which comprises two freely rotating rolls 7a, 7b. The rolls 7a, 7b are made movable with two positions: a first position where the rolls are spaced apart and a second position where the rolls are pressed together. FIGS. 2 and 3 show the first position of the rolls. The rolls 7a, 7b are arranged before the press head 2a at opposite sides of the fibre line passing through the press head.

The holder 6 is arranged to keep the end of a new fibre or the like near the press head, such that the end of the new fibre or the like 3b is positioned between the rolls 7a, 7b placed in the first position of the roll device as the first fibre or the like 3a travels between the rolls of the roll device to the press head. This is shown clearly in FIG. 2.

When the first fibre or the like 3a ends, the rolls 7a, 7b of the roll device are arranged to move to the second position, so that both the first fibre and the new fibre or the like remain between the rolls, and the tail of the first fibre or the like makes the rolls 7a, 7b rotate. In this situation, the holder 6 is arranged to open so that the rotating movement of the rolls 7a, 7b pushes the new fibre or the like 3b to the press head 2a at a speed equal to that of the line.

The rolls 7a, 7b are moved together or spaced apart by means of pressurized air, for example. The rotation of the rolls does not require separate actuators, but the rolls rotate freely. The rotational movement of the rolls is achieved solely by means of the tail of the first fibre or the like.

As stated above, the rolls 7a, 7b are open, which means that they are spaced apart during the coating process and the first fibre or the like 3a travels from between them to the press head 2a. The operator may place a new fibre in the holder 6 already during the process so that the end of the new fibre extends from between the rolls to a guide cone 2b provided in the press head 2a. This situation is shown in FIG. 2.

When the first fibre or the like 3a ends, the control system of the apparatus is informed of the situation, whereafter the rolls 7a, 7b are pressed together and the holder 6 is opened. Control information can be received from any suitable component, such as a fibre break sensor provided in the fibre pay-off. When the rolls press against one another, both the tail of the first fibre or the like 3a and the beginning of the new fibre remain between the rolls, and the progressive movement of the tail of the first fibre 3a makes the rolls 7a, 7b rotate, whereupon the rotational movement of the rolls moves or pushes the new fibre or the like 3b towards the press head at a speed equal to that of the line. Since the coating emerging from the press head breaks easily due to variation in tension, the line control unit may adjust the line process parameters momentarily during the jointing process so that the tension variation is minimized. For example, the line control may supply an additional accelerating signal to the fibre pay-off in order to provide sufficiently fast acceleration during the jointing process compared to normal operation.

The holder 6 can be formed of, for example, two flat surfaces 6a, 6b that are arranged to press together and to move to a distance from one another in a desired manner. The holder can also be implemented by means of two rolls, which are arranged such that they can be pressed together and spaced apart. The rolls must be mounted in bearings so that they only rotate in the direction of travel of the fibre or the line.

The operation of both the holder and the roll device can be implemented by means of any suitable arrangement, such as the use of pressurized air, an electric motor and so forth.

The embodiment described above is not intended to restrict the invention in any way, but the invention can be varied freely within the scope of the claims. Therefore it is clear that the arrangement according to the invention or the details thereof do not have to be exactly identical to those shown in the figures, but also other solutions are possible. For example, the invention is not restricted to only one fibre, but the invention can also be applied in the coating of more than one fibre. The expression 'fibre or the like' must be understood in the aforementioned scope. Nor is the invention restricted to only one coating material, but it can be applied in connection with various materials, in which case the invention is modified according to the needs of the material. Examples include PVC and polyamide. When using polyamide, the fibre must first be dried with a heat radiator, for example, which can be placed before the holder. Such an arrangement is naturally included within the scope of the invention. It is also clear that the scope of the invention includes an application comprising air blow that hardens the plastic after the press head, so that the coating does not break during the jointing step. The invention can also be applied in connection with a breaking device, wherein the reel storing the first fibre is not emptied entirely, but the fibre is cut at a certain moment and the process is continued with a new fibre as described above. Further, it is clear that the scope of the invention also includes an application where the jointing is activated already before the first fibre or the like breaks or is cut.

What is claimed is:

1. A method in connection with coating of an optical fibre in a fibre coating line, wherein a first fibre (3a) is directed from a fibre pay-off forward in the process via a press head (2a) forming the coating, and when the first fibre (3a) ends, a new fibre (3b) is guided to the press head (2a) and through it, characterized in that the new fibre (3b) is directed to the press head (2a) in advance, so that when the first fibre (3a) ends, a roll device (7) grips both the first fibre and the new fibre so that both fibres (3a, 3b) are caught between freely rotating rolls (7a, 7b) of the roll device (7), whereupon the tail of the first fibre (3a) makes the rolls (7a, 7b) of the roll device rotate, whereafter the rotational movement of the rolls pushes the new fibre in a fibre coating line (3b) to the press head (2a) at a speed equal to that of the line.

2. An arrangement in connection with coating of an optical fibre in a fibre coating line, wherein a first fibre (3a) is arranged to be directed from a fibre pay-off forward in the process via a press head (2a) forming the coating, and when the first fibre (3a) ends, a new fibre (3b) is arranged to be guided to the press head (2a) and through it, characterized in that the arrangement comprises a holder (6) and a roll device (7) comprising two freely rotating rolls (7a, 7b), which have two positions: a first position where the rolls (7a, 7b) are spaced apart and a second position where the rolls (7a, 7b) are pressed together, the rolls being arranged before the press head at opposite sides of the fibre line passing through the press head (2a), and the holder (6) being arranged to keep the end of the new fibre (3b) positioned between the rolls (7a, 7b) placed in the first position of the roll device as the first fibre (3a) travels from between the rolls of the roll device to the press head, and that when the first fibre (3a) ends, the rolls (7a, 7b) of the roll device are arranged to move into the second position so that both the first fibre and the new fibre remain between the rolls and the tail of the first fibre (3a) makes the rolls (7a, 7b) rotate, and the holder (6) is arranged to open, whereupon the rotational movement of the rolls (7a, 7b) pushes the new fibre (3b) to the press head (2a) at a speed equal to that of the line.

3. An arrangement according to claim 2, characterized in that the holder (6) is formed of two surfaces (6a, 6b), which are arranged to press together.

4. An arrangement according to claim 3, characterized in that the operation of both the holder (6) and the roll device (7) is implemented by pressurized air.

5. An arrangement according to claim 3, characterized in that the operation of both the holder (6) and the roll device (7) is implemented by an electric motor.

6. An arrangement according to claim 2, characterized in that the holder (6) is formed by means of two rolls which are arranged to press together and to rotate only in the direction of travel of the fibre.

7. An arrangement according to claim 6, characterized in that the operation of both the holder (6) and the roll device (7) is implemented by pressurized air.

8. An arrangement according to claim 6, characterized in that the operation of both the holder (6) and the roll device (7) is implemented by an electric motor.

9. An arrangement according to claim 2, characterized in that the operation of both the holder (6) and the roll device (7) is implemented by pressurized air.

10. An arrangement according to claim 2, characterized in that the holder (6) and the roll device (7) is implemented by an electric motor.

* * * * *